US010241987B2

(12) United States Patent
Maxime

(10) Patent No.: US 10,241,987 B2
(45) Date of Patent: Mar. 26, 2019

(54) METHOD AND SYSTEM FOR EDITING TEXT WITH A FIND AND REPLACE FUNCTION LEVERAGING DERIVATIONS OF THE FIND AND REPLACE INPUT

(75) Inventor: Daniel Maxime, Besne (FR)

(73) Assignee: International Business Machines Corporation, Armonk, NY (US)

( * ) Notice: Subject to any disclaimer, the term of this patent is extended or adjusted under 35 U.S.C. 154(b) by 1457 days.

(21) Appl. No.: 12/097,758

(22) PCT Filed: Oct. 27, 2006

(86) PCT No.: PCT/EP2006/067867
§ 371 (c)(1),
(2), (4) Date: Jun. 17, 2008

(87) PCT Pub. No.: WO2007/071482
PCT Pub. Date: Jun. 28, 2007

(65) Prior Publication Data
US 2008/0263443 A1      Oct. 23, 2008

(30) Foreign Application Priority Data
Dec. 22, 2005    (EP) ..................................... 05301092

(51) Int. Cl.
*G06F 17/00* (2006.01)
*G06F 17/24* (2006.01)
*G06F 17/27* (2006.01)

(52) U.S. Cl.
CPC .......... *G06F 17/24* (2013.01); *G06F 17/2755* (2013.01)

(58) Field of Classification Search
CPC ....................................................... G06F 17/24
USPC ......................................... 715/271, 255, 256
See application file for complete search history.

(56) References Cited

U.S. PATENT DOCUMENTS

| 4,420,817 A | 12/1983 | Yoshida |
| 5,873,660 A | 2/1999 | Walsh et al. |
| 5,999,896 A * | 12/1999 | Richardson et al. ............. 704/9 |
| 6,044,387 A * | 3/2000 | Angiulo et al. ............. 715/257 |
| 7,890,516 B2 * | 2/2011 | Zarzar Charur et al. ..... 707/751 |
| 2002/0129053 A1 * | 9/2002 | Chan et al. ................... 707/503 |

FOREIGN PATENT DOCUMENTS

| JP | 63020677 | 1/1988 |
| JP | 5143591 | 6/1993 |
| JP | 10269233 | 10/1998 |

* cited by examiner

*Primary Examiner* — Manglesh M Patel
(74) *Attorney, Agent, or Firm* — Steven M. Greenberg, Esq.; Shutts & Bowen LLP

(57) ABSTRACT

A method, computer program and system for performing a find and replace editing operation of a text starting from a couple of initial find and replace expressions provided by the user, applying each rule defining admissible inflected forms of the initial find and replace expressions, to the initial find and replace expressions to identify all the derived couples of find and replace expressions. The find expression and the replace expression of the derived couples correspond to inflected forms of the initial find and replace expressions. Then, for each match in the text of the find expression of the derived couples, proposing to the user the derived couples for replacement in the text.

15 Claims, 5 Drawing Sheets

METHOD AND SYSTEM FOR EDITING TEXT WITH A FIND AND REPLACE FUNCTION LEVERAGING DERIVATIONS OF THE FIND AND REPLACE INPUT

CROSS-REFERENCE TO RELATED APPLICATIONS

This application is a Submission Under 35 U.S.C. § 371 for U.S. National Stage patent application of International Application Number PCT/EP2006/067867 filed 27 Oct. 2006 and entitled A METHOD AND SYSTEM FOR EDITING TEXT WITH A FIND AND REPLACE FUNCTION LEVERAGING DERIVATIONS OF THE FIND AND REPLACE INPUT, which is related to and claims priority to European Patent Application Serial Number EP05301092.2 filed 22 Dec. 2005 the entirety of which are incorporated herein by reference.

FIELD OF THE INVENTION

The present invention generally relates to text editing and more particularly to an improved 'Find and Replace function'.

BACKGROUND OF THE INVENTION

Programmers very often add new functions/methods to their source code by copying relevant code that almost suits their needs, then replacing parts of it to fit the finest objectives of the new code at hand. Especially, patterns that are suitable for an element in a collection (such as an attribute or a method in a class, or a class in a package or a class) can be propagated by copying the code for an existing element, then replacing the name of the existing element by the name of the to-be-created element.

For example, considering that the following class that handles data elements has characteristics deemed desirable for a to-be-created concept segment, a programmer would typically copy the DataElement.java file contents to a Segment.java file, then edit the Segment.java file to replace all references to data elements by references to segments.
public class DataElement {
  public DataElement( ) {
  . . . .
  }
  private                        String DEFAULT_DATA_ELEMENT_NAME="dummyName";
  private                        String dataElementName=DEFAULT_DATA_ELEMENT_NAME;
  /** Return the data element name. */
  public String getDataElementName( ) {
  return dataElementName;
  }
}

For a very small example like this one, the programmer would have a few edits to do in place to replace the left column items with their right column counterparts:
data element segment
DATA_ELEMENT SEGMENT
dataElement segment
DataElement Segment When the length of the source gets bigger, the programmer would then switch to the use of a find and replace facility available in the editor (be the editor using a windowing system or not, find and replace commands are most often available). The problem then is that for a single conceptual replacement ('logically replace data element with segment'), the programmer ends up launching four find and replace commands.

Classical solutions to this problem include:

the use of the match case option to discriminate between different forms of the concept; while this is useful, this only partitions the problem, leaving the final say to the programmer on a case per case basis.

in the case of not using the match case option, some replacement tools (such as Microsoft® Word 2000) are able to infer simple case matching; for example, asking to replace 'data element' with 'segment' would yield the proposal to replace 'Data element' with 'segment', then effectively replace it with 'Segment'; it is noted that the same tool, asked to replace 'data element' with 'segment element' fails to replace 'data Element' with 'segment Element' but generates 'segment element' instead.

sophisticated regular expressions matching; using VI, Emacs or other powerful editors, skilled programmers can implement versatile replacement needs; this calls for sophisticated replacement expressions, hence is an error prone way of doing it though, and still does not solve the hardest cases.

The common limitation of those solutions is that they involve using the scenario multiple times to get the final desired outcome, with the programmer explicitly specifying each variation of the concept. Only VI or Emacs could tackle cases like DATA_ELEMENT, but it lacks facilities for other cases.

If we enlarge the problem considered above to the more general question of getting regular programming patterns applied to a few parameters that govern differences between their instances, numerous ways to do that exist, starting from templates that can be close to the final code aspect (for example some source tools provide templates and are able to generate parts of the code), or from more conceptual notations (such as UML). However, they do not follow the same scenario. In case the needed pattern exists in the tool or in a library developed over time by the programmer, they are perfectly fine. In case the programmer is exploring new avenues and refining emerging templates, the copy/paste/find and replace scenario is much more natural.

Another way of doing the find and replace phase of the scenario is to involve refactoring tools that are aware of the considered programming language semantics. For example, copy the DataElement class into another package, then ask a refactoring tool to rename it to Segment. While this would appropriately (and more accurately than any text based find and replace tool) change the class name, its constructor name, and even references to the class name in comments if asked so, it would fail though to match derived forms like dataElement. Moreover, acting at the semantic level is not always desirable or even possible. For example, if the new class is to be created into the same package than the existing one, there is no way to get it to compile right before performing part of the renaming process.

The editor Microsoft® Word 2000 for instance, provides an adaptive management of initial case in replacement. This editor provides a partial support for upper case when it is in first position of the word to be found. When performing a Find and Replace on regular expressions, it is difficult to specify the appropriate replacement upper case letter when it is not present in the searched string; this find and replace applied to find 'data element' and replace by 'segment element' would work for Data element, but not for data Element.

The U.S. Pat. No. 5,873,660 of Microsoft Corporation having as title 'Morphological search and replace applying to natural language' teaches to find inflected forms of a word by retrieving sets of word forms having a same root word. This implies that the find and replacement words match parts of speech. This solution for finding the inflected forms of input find and replace words is typical for text written in a natural language because the inflected forms can be derived from input find and replace words by applying the grammatical rules of the language. However, the inflected forms of input find and replace words of a text which is for instance a programming language cannot be found with this solution because the inflected forms are different lexico-syntactic forms which are not related to input find and replace words by known grammar rules one can refer to.

Furthermore, the solution of prior art for natural languages such as with the U.S. Pat. No. 5,873,660, are based on dictionaries. The dictionaries store all the inflected word forms for one given word. The size of the database storing the dictionary and the cost for maintaining this database becomes very unrealistic over time. The size and the control of the evolution of the database becomes even more unrealistic when instead of words, there is a need, as in the case of programming languages, for having a find and replace function applying not only to words but to expressions. In this case the dictionary should contain inflected forms for each expression that is for each possible word combination.

There is thus a need for a find and replace editing function performed in one pass and applying to a text written in a programming language or for other type of texts wherein the inflected forms of the input find or replace words or expressions are words or expressions which do not follow semantic or grammatical rules of a known natural language. With these languages, the inflected forms of input find or replace words or expressions may be different authorized lexico-syntactic codification for a same concept.

SUMMARY OF THE INVENTION

It is therefore an object of the present invention to provide a method for performing in one pass a find and replace of input find and replace words or expressions and/or inflected forms of these input, on a text written in a language which is not always a natural language.

The object is achieved with a method, computer program and system for performing a find and replace editing operation of a text starting from a couple of initial find and replace expressions provided by the user, applying each rule defining admissible inflected forms of the initial find expression and the initial replace expression, to the initial find and replace expression to identify all the derived couples of find expression and the replace expression which are valid for the rules. The find expression and the replace expression of the derived couples correspond to inflected forms of the initial find and replace expressions. Then, for each match in the text of the find expression of the derived couples, proposing to the user the derived couples for replacement in the text. The user interface is done through the usual graphical user interface of a text editor or through a text based terminal user interface. The find and replace operation may be passive through the execution of a program including find and replace commands or interactive by asking the user to give his choices during the execution of the program.

The find and replace method of the present invention selects inflected forms by applying pure lexico-syntactic transformations, unaware of the natural language. It applies to any type of text when the words or expressions are written in a natural language but may be used in the text out of the grammatical rules for the corresponding natural language.

The method of the invention provides a unified find and replace facility for multiple syntactic forms of a single concept, which is especially needed in programming environments; other solutions do not link together in a cohesive whole the different syntactic forms of a single concept.

The find and replace is performed within a single interaction instead of multiple ones; the user only has to launch one find and replace session; other solutions require that several passes be performed.

With the solution of the preferred embodiment of the invention, only a set of rules defining the admissible inflected forms of the words or expressions is stored. There is thus no use of oversized dictionaries for storing inflected forms of the input find and replace words or expressions.

The invention could benefit to other editing tools than programming tools. It is in essence as general as the find and replace concept. The fact is that, especially since fifteen years, a great emphasis has been put in programming on very consistent use of multiple forms of long names, each form of the name conveying some information to programmers, and the name itself conveying conceptual information. More recently, several software development methods have emphasized the role of the programs source code as an ultimate object of care, and favored exploratory ways of developing that code. This makes program editors a first class target for the invention.

An example outside of the programming arena would be the following.
Domain: history, biographies using last names.
Original Text:
'The Duke of Ellington was born in . . . Ellington is especially known for his . . . '
Rules:
   Title of Name->The Title of Name
   ->the Title of Name
   ->Name
Application:
   find and replace clause: ('Duke of Ellington', 'Prince of Wales')
   result:
'The Prince of Wales was born in . . . Wales is especially known for his . . . '

The solution of the present invention does not need large language dependent databases, and uses simpler algorithms, to a more complete effect.

The solution of the present invention can be improved by combining it with most functions of existing find and replace technologies. For example, it is fully compatible with the classical choice given to the end user to skip a match or to replace it with the replace expression. It is also compatible with the option to respect the case in find expressions or not, to match only whole words or to accept matches that are subparts of a word, and more generally with the use of regular expressions in the find expression. Furthermore, in those specific contexts where words are not used as keywords by the computing environment, it can combine with any other existing solution of the prior art for finding inflected forms for the words of the text, if they exist, which follow the grammatical rules for the corresponding natural language.

Other advantages are listed below:
   the find and replace function of the present invention generates variants instead of requiring that the user does it by himself, this saves time and typing errors; this also avoids that a specific inflected form remain in the text if the user does not think about it when performing the find and replace.

the find and replace of the present invention when applying for instance, to programming code text, only takes into account the words of the text and not a logical representation of programs, hence accommodates incomplete and incorrect program texts (which happen frequently in the development process); some of the most powerful other solutions (especially refactoring tools) are less tolerant of programming errors.

the solution of the present invention can be integrated into an existing find and replace function architecture, which lowers the cost of implementing the invention on the one hand, and makes it straightforward for users on the other hand.

the find and replace method of the present invention is operated in a flexible, extensible and customizable manner; the end user organization can tailor the solution to its needs on a company, department, team and individual basis.

the operating mode of the method is very easy to understand by programmers or users from one other domain.

as stated earlier, the method of the present invention applies to multiple programming languages, and potentially other formal languages beyond the scope of programmation.

DETAILED DESCRIPTION OF THE PREFERRED EMBODIMENT

Figure 1:
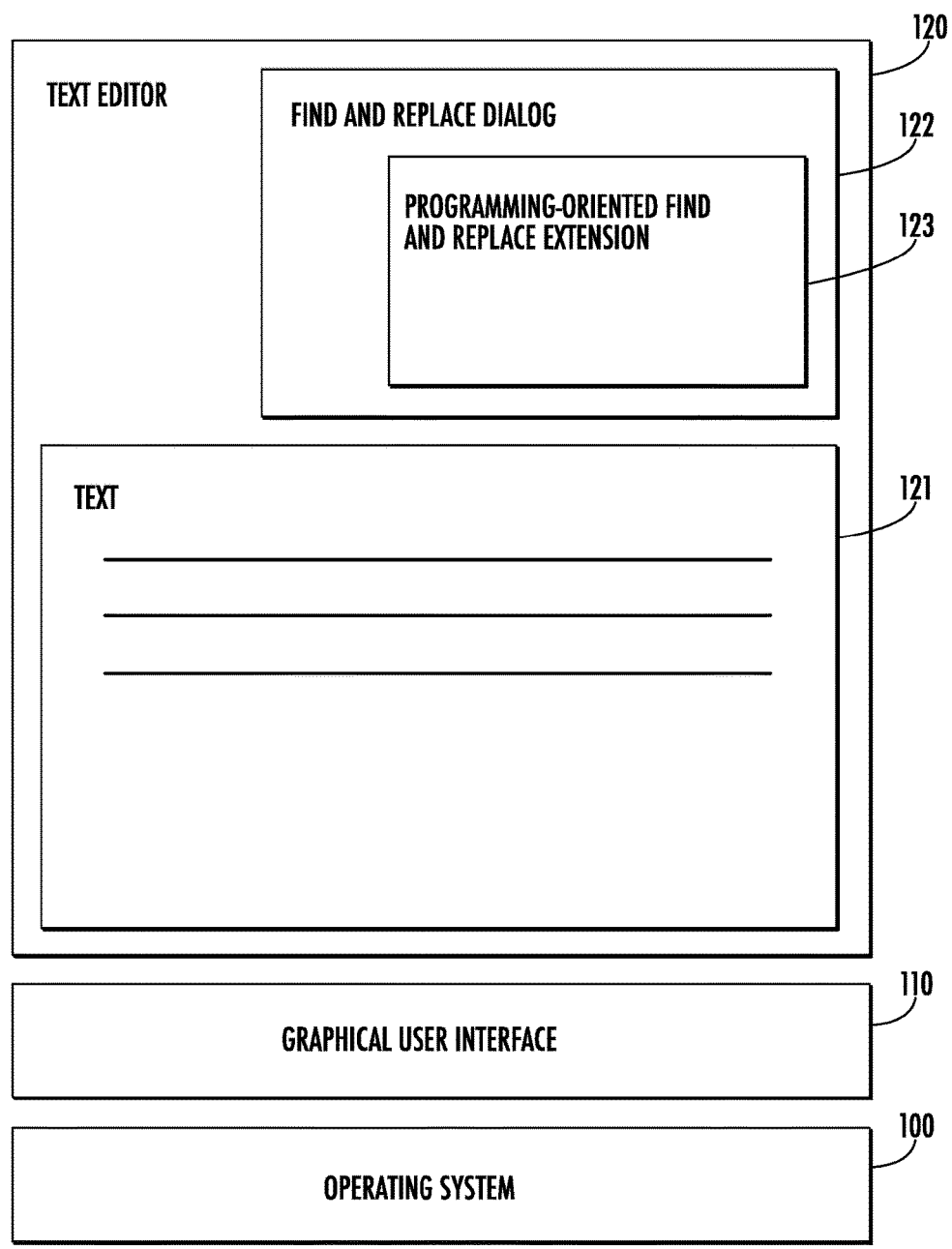
FIG. 1 is the system environment of the method of the invention according to the preferred embodiment.

FIG. 1 describes the system environment of the method of the invention according to the preferred embodiment. The preferred embodiment of the invention is a software program executing on a computer. A Text editor (120) is installed above an Operating System (100) which provides it with a Graphical User Interface layer (110). The Text editor (120) allows the end user to visualize and modify a Text (121). Amongst other capabilities, the Text editor (120) offers the end user a find and replace facility embodied by a Find and replace dialog (122). The invention extends the capabilities of the Find and replace Dialog (122) by means of a Programming-oriented find and replace extension (123) which inputs, outputs and behavior are detailed later in the document in reference to the other figures. This extension must be woven into the find and replace function of the editor. It is expected that this may be possible by the use of external APIs in some cases, but that, in general, the source code of the editor would have to be modified. In the latter case, the needed modification should mainly impact the find and replace module of the said editor, except if its code is not organized into clearly defined modules. The invention can be implemented within virtually all the text editing software packages that include a find and replace functionality. Examples include systems which have a richer user interface than the one exposed in the preferred embodiment, like Integrated Development Environments, or a simpler user interface, like terminal-oriented text editors. It is preferable, but not mandatory, that the find and replace function provides an interactive means for the user to selectively accept or reject suggested changes to the text.

Figure 2:
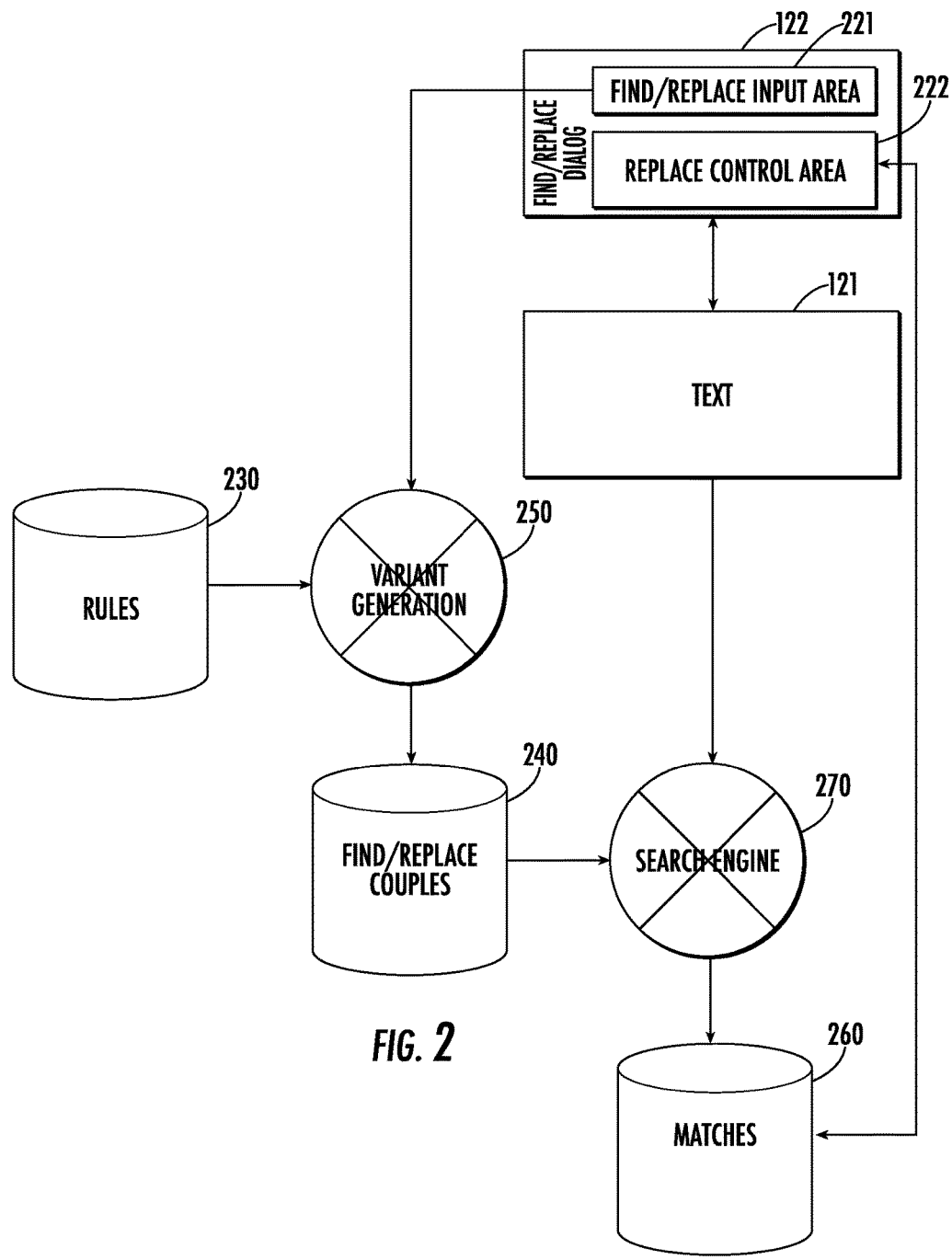
FIG. 2 shows the components that compose the preferred embodiment of the invention and its immediate context.

FIG. 2 illustrates the components used when executing the method of the preferred embodiment.

It is noted that user interface may be done through the usual graphical user interface of a text editor or through a text based terminal user interface. The find and replace operation may be passive through the execution of a program including find and replace commands or interactive by asking the user to give his choices during the execution of the program. In the preferred embodiment, the operation is done through the graphical user interface of an existing text editor and in an interactive way, that is through a dialog with the user.

The user interface interfaces a find and replace dialog (122) to a Text (121) under the Text editor. The find and replace dialog acts upon the Text (121) and collects user input, with a find and replace input area (221) and a Replace dialog control area (222). The find and replace input area (221) is classical in most text editing software packages and is essentially comprised of:

an input area to collect the find expression, which must be comprised of one or more words, an input area to collect the replace expression, which is formed as the find expression, zero to many options (like match case or not, find into the whole document or not, etc.).

The Replace dialog control area is classically composed of a few graphical controls that allow the user to decide, on a find expression match basis, whether he wants to replace it by the replace expression or not. This is often extended by the option to replace all remaining matches and other similar refinements. In the preferred embodiment of the invention is added a multiple selection interface in which are displayed all the possible replace expressions for any given match on the find expression. Depending on rules specified in the Rules store (230) and the precise contents of the Text (121), each find expression may have zero, one or many matches, and each match if any may yield one or many replace expressions. Whenever many replace expressions are possible, the Replace dialog control area (222) must give the user the possibility to chose her preferred replace expression (or to skip the match altogether). In the replace control area are listed the distinct find expressions one at a time and all the possible replace expressions for each find expression.

A Rules database (230) contains the transformation rules that must be applied to find and replace couples. A rule is typically implemented as a routine that takes a string in input and returns a transformed string as output. Almost no constraint applies to transformation rules (essentially, they should never fail, and they should never return an empty string). Hence, they can accommodate the needs of any formal language, be it a programming language or not. Various embodiments of the invention may use to this effect different programming languages, or even formal languages of an higher order (for example pattern matching engines). An example of rule would be a Java method that would capitalize all alphabetic characters of its input string and leave other characters unchanged. This is a distinctive and essential part of the method of the preferred embodiment of the invention. A find and replace couples database (240) stores the find and replace couples obtained by the application of Rules (230) to the find and replace couple entered into the find and replace dialog (122), without the duplicates.

A Variant generation engine (250) applies the Rules (230) to the strings of the initial find and replace couples entered into the find and replace dialog (122) to obtain their inflected forms. The inflected forms of the initial find and replace couples are stored in a find and replace couples database (240). The Variant generation engine (250) essentially applies all possible rules of the Rules database (230) to the initial find and replace couple, then removes duplicates. The duplicates removal can be performed after the generation of all possible variants, or just in time during the generation. The Variant generation engine (250) technology can be of various natures. In the preferred embodiment of the invention, it would be a Java class or cluster of classes capable to leverage Rules (230) described as Java methods.

An index of matches in the Text (121) stores the find expressions pointing to the find and replace couples (240). One example of index in the text can be storing the place of the match in the text and the extent in the Text (121) of the matching characters string, to which is added an identifier of the find expression that matches. Some Text editors (120) may already establish and leverage a formal storing of matches during find and replace operations. The invention needs a richer Matches database (260) that supplements classical ones with, at least, the indication of the matching find expression for each match (whereas the find expression is unique when the invention is not involved).

A classical Search engine (270) is capable to identify in the Text (210) matches for find expressions of the find and replace couples (240) so as to produce the entries of the Matches database (260). It is expected that the invention could leverage the Search engine (270) without modifying it in most cases, though it may need multiple find passes, each pass collecting the matches for a given find expression.

Figure 3:
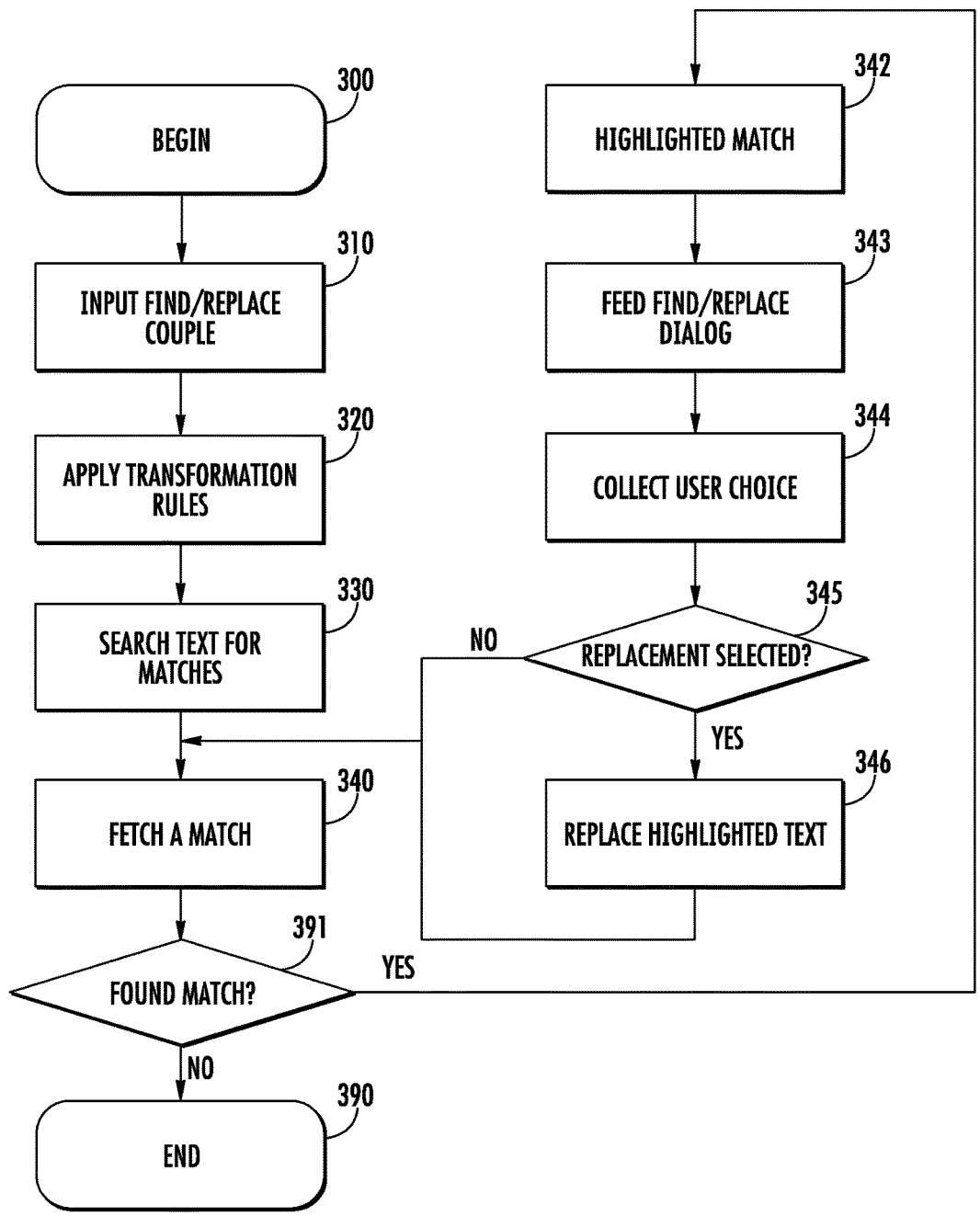
FIG. 3 is the flowchart of a find and replace operation as implemented in the preferred embodiment of the invention.

FIG. 3 is the flowchart of a find and replace operation as implemented in the preferred embodiment of the invention. When a find and replace operation is started (300), the user enters (301) a find and replace couple through the find and replace area (221) of the find and replace dialog (122). The transformation Rules stored in the Rules database are applied (320) to the find and replace couple to find the inflected forms for this couple and store it in the find and replace couples database (240) (more details are provided for this step in FIG. 4). The Search engine (270), searches (330) the Text (121) to find the matches of find expressions of the find and replace couples database (240). The matches found are stored in the Matches database (260). When all the matches are found, each match fetched in the Matches database (260) (answer yes to test 341) is highlighted by the find and replace dialog in the corresponding part of the Text (121). The Replace control area (222) is fed (343) with all the possible replace expressions for the match, which are the replace members of the find and replace couples found in the find and replace couples database (240) for which the find expression is identical to the one of the match found in step 340. The user choice of replace expression or no replacement by means of the Replace control area (222) is collected (344). If the user selects no replacement (answer No to test 345) a new match is read (340) and a new loop (342-346) is performed until all the matches are fetched (answer No to test 241) in the Matches database (End 390). If the user selects a replacement (answer Yes to test 345), the highlighted text is replaced (346) by the replace expression selected by the user in step 344, then the next match is fetched in the Matches database.

It is noted that there are other embodiments of the invention: in the example provided in the flow chart of FIG. 3 all the matches are first collected (300-330), then once all the matches are stored, they are displayed to the user (340-390) in a certain order. One other option could be to display the result once computed.

The order for displaying the matches is variable also. One preferred choice may be to display successively for each different find expression, all the matching couples starting with a same find expression. One other choice could be to display the matching couples in the order in which the match of the find expression appears in the text. One third possibility which makes the find and replace operation easiest is to propose that the first user choice among all the possible replace inflected forms to be the replace inflected form corresponding to the previous user choice on the preceding match in the text.

Figure 4:
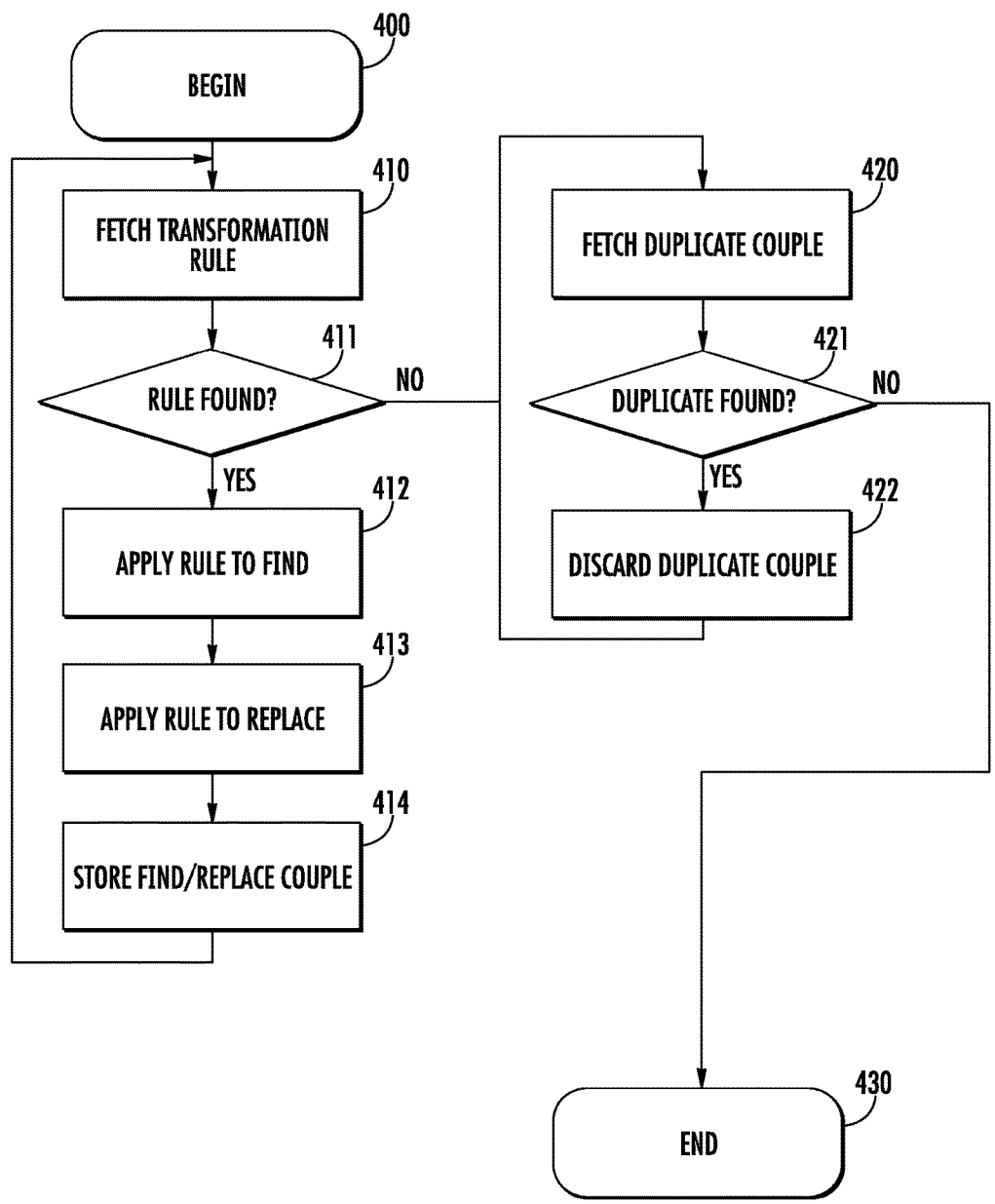
FIG. 4 details a possible embodiment of the step for applying a transformation rule (320) of FIG. 3.

FIG. 4 details a possible embodiment of the step for applying a transformation rule (320) of FIG. 3. The step (320) is for applying transformation Rules stored in the Rules database to the find and replace couple to find the inflected forms for this couple. It begins (400), after execution of step 310, with an input made of a couple of expressions, the first element being the find expression, and the second element being the replace expression. These have been provided during the Input find and replace couple (310) step of FIG. 3 by the end user as a command executed in a program, when the interface to the user is passive, or through a find and replace dialog (122) of a graphical user interface. The option of the preferred embodiment is to use a graphical user interface preferably the graphical user interface of the usual editor to have a dialog with the user. The dialog box comprises a find and replace field and other editing options. A part of the screen is dedicated to displaying of the text in edition. On the text are highlighted progressively all the operations which are performed by the user. A transformation rule is fetched (410) from the Rules database (230). When a rule is found (answer Yes to test 411), the current transformation rule fetched by step 410 is applied (412) to the find expression received at the beginning (400) and applied (413) to the replace expression received at the beginning (400). A resulting find and replace couple is computed which may comprise an inflected form for the initial find expression and an inflected form for the initial replace expression. The reason for the 'may' comprise inflected forms is that among the rules of the language one could be 'change nothing'. Applying the 'change nothing' to an initial find expression and an initial replace expression (hello, bye) gives the resulting couple (hello, bye). In this case the resulting couple comprises no inflected form but the initial expressions as with the basic find and replace function of an editor.

It is noted also that when applying successively two rules to the initial find expression (412) and the initial replace expression means that the resulting couples are not formed of all the Cartesian product couples obtained while applying the first and the second rule independently to the find expression and to the replace expression. On the contrary as seen in the following example, the derived couples are computed on the basis of one rule, independently of the other rules. For clarification, if one take as an example the initial couple provided by the user ('hello', 'bye'), when applying the rule 'change nothing' is obtained one derived couple ('hello', 'bye') and when applying the rule 'capitalize all letters' is obtained one derived couple ('HELLO', 'BYE'). The couples ('hello', 'BYE') and ('HELLO', 'bye') obtained by Cartesian product from the initial couple when mixing the two rules are not considered as derived couples according to the method of the preferred embodiment.

The resulting find and replace couple is stored (414) in the find and replace Couples database (240). A new transformation Rule is fetched in the Rules database (410). If no more rule is found (answer No to test 411), the duplicate find and replace couples are fetched (420) in the find and replace database (240). A couple is a duplicate of another couple if and only if its find expression has the same length and is equal to the first couple find expression when compared on a character per character basis, and the same holds true for their replace expressions. If a duplicate can be found (answer Yes to test 421), the duplicate couple is removed (422) from the find and replace couples database. The step 320 ends (430) when no more duplicates can be found (answer No to test 421). At the end of this step, the find and replace couples database (240) comprises as many unique find and replace couples as it can be generated given the original find and replace couple entered by the user in step 310 and the transformation rules specified in the Rules database (230). End of the flow chart (430) means going to execution of step 330.

Other embodiments may implement different strategies to the same effect. These include but are not limited to a selective insertion into step 410, by which existing couples would not be added to the find and replace couples database, or a sort of the find and replace couples database before duplicates elimination.

Figure 5:
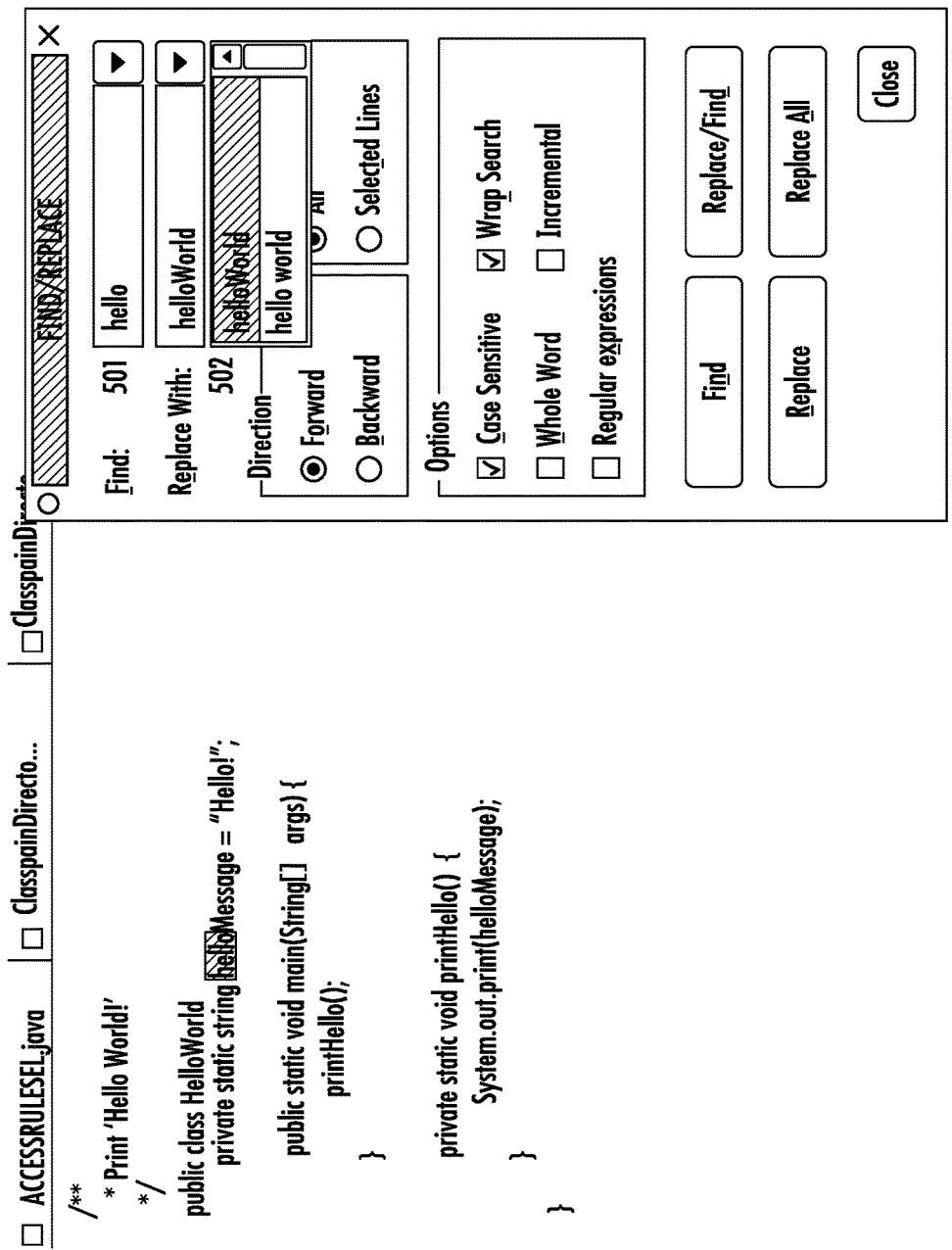
FIG. 5 is an illustration of the preferred embodiment of the invention using a Graphical User Interface.

FIG. 5 is an illustration of the preferred embodiment of the invention using a Graphical User Interface. The image is not a real screen capture taken from the embodiment of the invention but it has been composed using image manipulation tools. On this image is represented, on the right part, the dialog between the user and the computer illustrated with a replacement proposal provided by the computer to the user for a given find and replace request (find hello, replace hello world) entered by the user. The left part of the image represents the text in edition and illustrates some other replacement proposals provided by the computer to the user for a given find and replace request (find hello, replace hello world) entered by the user. In this example the text is Java source code, the editor being a Java source code editor.

The find and replace dialog is shown in the right part of the image. It comprises an input area (501) for the user to enter the find expression. This matches part of the find and replace input area (221) of FIG. 2, the other part being implemented as 502. It may also play a role in step Feed find and replace dialog (343) of FIG. 3 since it can repeat the current match, also highlighted in the Text (210): 504.

A second input area is used for the user to enter the replace expression, with a drop down list to show all possible derivations for the current match. This matches part of the find and replace input area (221) and implements the core capabilities of the Replace control area (222).

As described in the flow charts of FIG. 3 and FIG. 4, when the user has entered the find and replace expressions, the computer applies each rule to the find and replace expressions and find possible derived forms of find and/or replace expressions according to the rules. The corresponding couples corresponding to the find and replace computed derived forms are stored. Then the computers looks for the matches in the text of the find part of the stored couples and builds couples for the matches with a proposed replace part according to the replace part of the couples which have been stored. The duplicate find and replace couples are suppressed. Then, the computers looks for the matches in the text of the find part of the stored couples and stores the matches. Then, for each match in turn, the matching find expression and the replace expressions of the matching couples are proposed to the user through the same find and replace input areas (501, 502) of the dialog.

In the right part of the image of FIG. 5 the user has entered find 'hello' and replace by 'hello world' and the computer has proposed two matching couples:

(hello, hello word) corresponding to the rule: 'change nothing'

(hello, helloWorld) corresponding to the rule: 'capitalize the second and the following words and suppress white spaces'.

The user has the opportunity to select in the Replace area (502) a replacement for the match according to the first or the second rule or to leave it unchanged. In the image, 'helloWorld' is highlighted, this means that a replacement for the match according to the second rule has been chosen by the user.

The left part of the image of FIG. 5 shows the Java code in edition. Corresponding to the same find (hello) and replace (hello word) values of input areas entered by the customer, the computer has proposed a matching couple (Hello, HelloWorld) (503) corresponding to the rule: 'capitalize all words and suppress white spaces'.

In the text the match (504) is grayed to indicate to the user a match with the initial find word or expression.

Coming back to the right part of the image, the dialog shows other classical options of the find and replace dialog. By clicking on the 'Whole Word' check box, the user may exclude that the computer proposes match 504. This ability of the find and replace implementation is not peculiar to the preferred embodiment of the invention, but gives an example of its compatibility with the preexisting find and replace technology.

It is expected that the databases (Rules 230, find and replace couples 240, Matches 260) used in the preferred embodiment of the invention have relatively few elements, and that those elements be short lived (typically, they would not be used past a given find and replace session). Therefore, embodiments of the invention could use a variety of implementations for these databases, ranging from in-memory transient lists to records into a full-fledged database, depending on other constraints on the operating environment and desired non functional requirements (performance, memory footprint, etc.).

It is noted that the meaning of 'expression' and 'inflected form' can be generalized because one can consider that an expression being at least one word may correspond to one word only. Similarly, the inflected forms of an initial find expression and an initial replace expression which are admissible by a rule can be the same initial find expression and initial replace expression if the rule is 'change nothing'.

The invention claimed is:

1. A method for performing, by a processor of a computer, a find and replace editing operation of a text, said method comprising:

receiving both a find expression and also a replace expression in a find and replace dialog box of a graphical user interface of a text editor hosted by an operating system of the computer;

retrieving from a data store, a multiplicity of transformation rules, each of the rules transforming both words of a specified find expression and also a corresponding replace expression into an inflected form of the specified find expression and the corresponding replace expression;

applying each one of the multiplicity of transformation rules to the received find expression and the received replace expression, the application producing a multiplicity of couples, each of the couples comprising a different inflected form of the received find expression and the received replace expression;

storing the multiplicity of couples in the data store;

parsing text in a text field of the graphical user interface;

retrieving from the data store, each of the multiplicity of couples;

searching the parsed text for the received find expression and also for each inflected form of the find expression stored in the data store as part of a couple amongst the retrieved multiplicity of couples; and, for each found inflected form of the find expression, presenting in the dialog box, a proposed replace expression comprising of an inflected form of the received replace expression stored in the data store in correspondence to the found inflected form of the find expression in a common one of the multiplicity of couples.

2. The method of claim 1, further comprising pruning the couples of the data store to remove duplicates of the couples.

3. The method of claim 1, further comprising highlighting each found inflected form of the find expression in the parsed text of the graphical user interface.

4. The method of claim 1, wherein the different inflected form of the received replace expression in one of the multiplicity of couples is a concatenation and a removal of white space between two words of the received replace expression.

5. The method of claim 1, wherein the different inflected form of the received replace expression in one of the multiplicity of couples is a capitalization of all characters of all words of the received replace expression.

6. A system for performing a find and replace editing operation of a text, said system comprising:

a computer with memory, a processor and a data store; and, a find and replace module comprising program instructions enabled to perform:

receiving both a find expression and also a replace expression in a find and replace dialog box of a graphical user interface of a text editor hosted by an operating system of the computer;

retrieving from a data store, a multiplicity of transformation rules, each of the rules transforming both words of a specified find expression and also a corresponding replace expression into an inflected form of the specified find expression and the corresponding replace expression;

applying each one of the multiplicity of transformation rules to the received find expression and the received replace expression, the application producing a multiplicity of couples, each of the couples comprising a different inflected form of the received find expression and the received replace expression;

storing the multiplicity of couples in the data store;

parsing text in a text field of the graphical user interface;

retrieving from the data store, each of the multiplicity of couples;

searching the parsed text for the received find expression and also for each inflected form of the find expression stored in the data store as part of a couple amongst the retrieved multiplicity of couples; and, for each found inflected form of the find expression, presenting in the dialog box, a proposed replace expression comprising of an inflected form of the received replace expression stored in the data store in correspondence to the found inflected form of the find expression in a common one of the multiplicity of couples.

7. The system of claim 6, further comprising pruning the couples of the data store to remove duplicates of the couples.

8. The system of claim 6, further comprising highlighting each found inflected form of the find expression in the parsed text of the graphical user interface.

9. The method of claim 6, wherein the different inflected form of the received replace expression in one of the multiplicity of couples is a concatenation and a removal of white space between two words of the received replace expression.

10. The system of claim 6, wherein the different inflected form of the received replace expression in one of the multiplicity of couples is a capitalization of all characters of all words of the received replace expression.

11. A computer program product comprising programming code instructions executing in a computer with a processor and memory and executing the steps of a method for performing a find and replace editing operation of a text, said method comprising:

receiving both a find expression and also a replace expression in a find and replace dialog box of a graphical user interface of a text editor hosted by an operating system of the computer;

retrieving from a data store, a multiplicity of transformation rules, each of the rules transforming both words of a specified find expression and also a corresponding replace expression into an inflected form of the specified find expression and the corresponding replace expression;

applying each one of the multiplicity of transformation rules to the received find expression and the received replace expression, the application producing a multiplicity of couples, each of the couples comprising a different inflected form of the received find expression and the received replace expression;

storing the multiplicity of couples in the data store;

parsing text in a text field of the graphical user interface;

retrieving from the data store, each of the multiplicity of couples;

searching the parsed text for the received find expression and also for each inflected form of the find expression stored in the data store as part of a couple amongst the retrieved multiplicity of couples; and, for each found inflected form of the find expression, presenting in the dialog box, a proposed replace expression comprising of an inflected form of the received replace expression stored in the data store in correspondence to the found inflected form of the find expression in a common one of the multiplicity of couples.

12. The computer program product of claim 11, wherein the method further comprises pruning the couples of the data store to remove duplicates of the couples.

13. The computer program product of claim 11, wherein the method further comprises highlighting each found inflected form of the find expression in the parsed text of the graphical user interface.

14. The computer program product of claim 11, wherein the different inflected form of the received replace expression in one of the multiplicity of couples is a concatenation and a removal of white space between two words of the received replace expression.

15. The computer program product of claim 11, wherein the different inflected form of the received replace expression in one of the multiplicity of couples is a capitalization of all characters of all words of the received replace expression.

* * * * *